US006714994B1

United States Patent
Keller et al.

(10) Patent No.: US 6,714,994 B1
(45) Date of Patent: Mar. 30, 2004

(54) HOST BRIDGE TRANSLATING NON-COHERENT PACKETS FROM NON-COHERENT LINK TO COHERENT PACKETS ON CONHERENT LINK AND VICE VERSA

(75) Inventors: James B. Keller, Palo Alto, CA (US); Derrick R. Meyer, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/429,118

(22) Filed: Oct. 27, 1999

Related U.S. Application Data

(63) Continuation-in-part of application No. 09/410,852, filed on Oct. 1, 1999, which is a continuation-in-part of application No. 09/399,281, filed on Sep. 17, 1999, which is a continuation-in-part of application No. 09/220,487, filed on Dec. 23, 1998, now Pat. No. 6,167,492.

(51) Int. Cl.⁷ ................................................. G06F 3/00
(52) U.S. Cl. ................................ 710/5; 710/4; 710/33; 711/141
(58) Field of Search ............................ 709/201, 246, 709/238; 710/4, 7, 65, 5, 33; 711/141

(56) References Cited

U.S. PATENT DOCUMENTS

| | | | | |
|---|---|---|---|---|
| 5,297,269 A | * | 3/1994 | Donaldson et al. | |
| 5,634,138 A | * | 5/1997 | Ananthan et al. | |
| 5,640,570 A | * | 6/1997 | St. Clair et al. | |
| 5,673,399 A | * | 9/1997 | Guthrie et al. | |
| 5,732,285 A | * | 3/1998 | Harrison et al. | |
| 5,749,095 A | | 5/1998 | Hagersten | |
| 5,829,034 A | * | 10/1998 | Hagersten et al. | |
| 5,884,100 A | * | 3/1999 | Normoyle et al. | |
| 5,960,179 A | * | 9/1999 | Hagersten | |
| 5,990,914 A | * | 11/1999 | Horan et al. | |
| 6,092,155 A | * | 7/2000 | Olnowich | |
| 6,101,420 A | | 8/2000 | Van Doren et al. | |
| 6,108,721 A | * | 8/2000 | Bryg et al. | |
| 6,108,752 A | | 8/2000 | Van Doren et al. | |
| 6,138,218 A | * | 10/2000 | Arimilli et al. | |
| 6,167,492 A | * | 12/2000 | Keller et al. | 209/238 |
| 6,182,168 B1 | * | 1/2001 | Guthrie | |
| 6,205,508 B1 | * | 3/2001 | Bailey et al. | |
| 6,209,065 B1 | | 3/2001 | Van Doren et al. | |
| 6,226,695 B1 | * | 5/2001 | Kaiser et al. | |

(List continued on next page.)

Primary Examiner—Le Hien Luu
Assistant Examiner—Stephan Willett
(74) Attorney, Agent, or Firm—Lawrence J. Merkel; Meyertons, Hood, Kivlin, Kowert & Goetzel, P.C.

(57) ABSTRACT

A computer system is presented which implements a system and method for conveying packets between a coherent processing subsystem and a non-coherent input/output (I/O) subsystem. The processing subsystem includes a first processing node coupled to a second processing node via a coherent communication link. The first processing node includes a host bridge which translates packets moving between the processing subsystem and the I/O subsystem. The I/O subsystem includes an I/O node coupled to the first processing node via a non-coherent communication link. The I/O node may embody one or more I/O functions (e.g., modem, sound card, etc.). The coherent and non-coherent communication links are physically identical. For example, the coherent and non-coherent communication links may have the same electrical interface and the same signal definition. The host bridge translates non-coherent packets from the I/O node to coherent packets, and transmits the coherent packets to the second processing node. The host bridge also translates coherent packets from the second processing node to non-coherent packets, and transmits the non-coherent packets to the I/O node. The coherent and non-coherent packets have identically located command fields. The translating process includes copying the contents of the command field of one packet type to the command field of the other packet type.

27 Claims, 12 Drawing Sheets

U.S. PATENT DOCUMENTS

| | | |
|---|---|---|
| 6,249,846 B1 | 6/2001 | Van Doren et al. |
| 6,295,573 B1 * | 9/2001 | Bailey et al. |
| 6,353,877 B1 * | 3/2002 | Duncan et al. |
| 6,362,833 B2 * | 3/2002 | Trika |
| 6,385,705 B1 | 5/2002 | Keller et al. |
| 6,389,526 B1 * | 5/2002 | Keller et al. ............... 711/141 |
| 6,421,775 B1 * | 7/2002 | Brock et al. |
| 6,434,640 B1 * | 8/2002 | Keller |
| 6,434,649 B1 * | 8/2002 | Baker et al. |
| 6,480,845 B1 * | 11/2002 | Egolf et al. |
| 6,499,079 B1 * | 12/2002 | Gulick |
| 2001/0025328 A1 * | 9/2001 | Marietta et al. |
| 2001/0051977 A1 * | 12/2001 | Hagersten |
| 2002/0083254 A1 * | 6/2002 | Hummel et al. |
| 2002/0103945 A1 * | 8/2002 | Owen et al. |
| 2002/0103948 A1 * | 8/2002 | Owen et al. |

* cited by examiner

| Bit Time | 7 | 6 | 5 | 4 | 3 | 2 | 1 | 0 |
|---|---|---|---|---|---|---|---|---|
| 1 | | | CMD[5:0] | | | | | |
| 2 | | | | | | | | |
| 3 | | | | | | | | |
| 4 | | | | | | | | |

| Bit Time | 7 | 6 | 5 | 4 | 3 | 2 | 1 | 0 |
|---|---|---|---|---|---|---|---|---|
| 1 | SrcUnit[1:0] | | CMD[5:0] | | | | | |
| 2 | DestNode[2:0] | | | DestUnit[1:0] | | SrcNode[2:0] | | |
| 3 | | | | SrcTag[4:0] | | | | |
| 4 | | | | | | | | |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

| Bit Time | 7 | 6 | 5 | 4 | 3 | 2 | 1 | 0 |
|---|---|---|---|---|---|---|---|---|
| 1 | SrcUnit[1:0] | | CMD[5:0] | | | | | |
| 2 | DestNode[2:0] | | | DestUnit[1:0] | | SrcNode[2:0] | | |
| 3 | | | | SrcTag[4:0] | | | | |
| 4 | Sh | | | | | | | |

| Bit Time | 7 | 6 | 5 | 4 | 3 | 2 | 1 | 0 |
|---|---|---|---|---|---|---|---|---|
| 1 | Data[7:0] | | | | | | | |
| 2 | Data[15:8] | | | | | | | |
| 3 | Data[23:16] | | | | | | | |
| 4 | Data[31:24] | | | | | | | |
| 5 | Data[39:32] | | | | | | | |
| 6 | Data[47:40] | | | | | | | |
| 7 | Data[55:48] | | | | | | | |
| 8 | Data[63:56] | | | | | | | |

| CMD Code | VChan | Command | Packet Type |
|---|---|---|---|
| 000000 | - | Nop | Info |
| 000001 | NPC | VicBlk | Command/Data |
| 000010 | | Reserved | |
| 000011 | NPC | ValidateBlk | Command |
| 000100 | NPC | RdBlk | Command |
| 000101 | NPC | RdBlkS | Command |
| 000110 | NPC | RdBlkMod | Command |
| 000111 | NPC | ChangetoDirty | Command |
| x01xxx | NPC or PC | WrSized | Command/Data |
| 01xxxx | NPC | ReadSized | Command |
| 100xxx | | Reserved | |
| 110000 | R | RdResponse | Response/Data |
| 110001 | R | ProbeResp | Response |
| 110010 | R | TgtStart | Response |
| 110011 | R | TgtDone | Response |
| 110100 | R | SrcDone | Response |
| 110101 | R | MemCancel | Response |
| 11011x | | Reserved | |
| 11100x | P | Probe | Command |
| 111010 | P | Broadcast | Command |
| 111011 | | Reserved | |
| 11110x | | Reserved | |
| 111110 | | Reserved | |
| 111111 | - | Sync | Info |

| Bit Time | 7 | 6 | 5 | 4 | 3 | 2 | 1 | 0 |
|---|---|---|---|---|---|---|---|---|
| 1 | SeqID[3:2] | | CMD[5:0] | | | | | |
| 2 | PassPW | SeqID[1:0] | | UnitID[4:0] | | | | |
| 3 | | | | SrcTag[4:0] | | | | |
| 4 | | | | | | | | |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

| Bit Time | 7 | 6 | 5 | 4 | 3 | 2 | 1 | 0 |
|---|---|---|---|---|---|---|---|---|
| 1 | | | CMD[5:0] | | | | | |
| 2 | PassPW | | | UnitID[4:0] | | | | |
| 3 | | | | SrcTag[4:0] | | | | |
| 4 | | | | | | | | |

| CMD Code | VChan | Command | Packet Type |
|---|---|---|---|
| 000000 | - | Nop | Info |
| 000001 | | Reserved | |
| 000010 | NPC | Flush | Command |
| 000011 | | Reserved | |
| 0001xx | | Reserved | |
| x01xxx | NPC or PC | WrSized | Command/Data |
| 01xxxx | NPC | ReadSized | Command |
| 100xxx | | Reserved | |
| 110000 | R | RdResponse | Response/Data |
| 110001 | | Reserved | |
| 110010 | | Reserved | |
| 110011 | R | TgtDone | Response |
| 11010x | | Reserved | |
| 110110 | | Reserved | |
| 110111 | R | AssignAck | Response |
| 11100x | | Reserved | |
| 111010 | PC | Broadcast | Command |
| 111011 | | Reserved | |
| 11110x | | Reserved | |
| 111110 | - | Assign | Info |
| 111111 | - | Sync | Info |

HOST BRIDGE TRANSLATING NON-COHERENT PACKETS FROM NON-COHERENT LINK TO COHERENT PACKETS ON CONHERENT LINK AND VICE VERSA

This application is a continuation-in-part of U.S. patent application Ser. No. 09/220,487, filed Dec. 23, 1998, now U.S. Pat. No. 6,167,492. This application is a continuation-in-part of U.S. patent application Ser. No. 09/399,281, filed Sep. 17, 1999. This application is a continuation-in-part of U.S. patent application Ser. No. 09/410,852, filed Oct. 1, 1999.

BACKGROUND OF THE INVENTION

1. Field of the Invention

This invention is related to the field of computer systems and, more particularly, to computer systems wherein input/output (I/O) operations access memory.

2. Description of the Related Art

Generally, personal computers (PCs) and other types of computer systems have been designed around a shared bus system for accessing memory. One or more processors and one or more input/output (I/O) devices are coupled to memory through the shared bus. The I/O devices may be coupled to the shared bus through an I/O bridge which manages the transfer of information between the shared bus and the I/O devices, while processors are typically coupled directly to the shared bus or are coupled through a cache hierarchy to the shared bus.

Unfortunately, shared bus systems suffer from several drawbacks. For example, the multiple devices attached to the shared bus present a relatively large electrical capacitance to devices driving signals on the bus. In addition, the multiple attach points on the shared bus produce signal reflections at high signal frequencies which reduce signal integrity. As a result, signal frequencies on the bus are generally kept relatively low in order to maintain signal integrity at an acceptable level. The relatively low signal frequencies reduce signal bandwidth, limiting the performance of devices attached to the bus.

Lack of scalability to larger numbers of devices is another disadvantage of shared bus systems. The available bandwidth of a shared bus is substantially fixed (and may decrease if adding additional devices causes a reduction in signal frequencies upon the bus). Once the bandwidth requirements of the devices attached to the bus (either directly or indirectly) exceeds the available bandwidth of the bus, devices will frequently be stalled when attempting access to the bus, and overall performance of the computer system including the shared bus will most likely be reduced.

On the other hand, distributed memory systems lack many of the above disadvantages. A computer system with a distributed memory system includes multiple nodes, two or more of which are coupled to different memories. The nodes are coupled to one another using any suitable interconnect. For example, each node may be coupled to each other node using dedicated lines. Alternatively, each node may connect to a fixed number of other nodes, and transactions may be routed from a first node to a second node to which the first node is not directly connected via one or more intermediate nodes. A memory address space of the computer system is assigned across the memories in each node.

In general, a "node" is a device which is capable of participating in transactions upon the interconnect. For example, the interconnect may be packet based, and the node may be configured to receive and transmit packets. Generally speaking, a "packet" is a communication between two nodes: an initiating or "source" node which transmits the packet and a destination or "target" node which receives the packet. When a packet reaches the target node, the target node accepts the information conveyed by the packet and processes the information internally. A node located on a communication path between the source and target nodes may relay the packet from the source node to the target node.

Distributed memory systems present design challenges which differ from the challenges in shared bus systems. For example, shared bus systems regulate the initiation of transactions through bus arbitration. Accordingly, a fair arbitration algorithm allows each bus participant the opportunity to initiate transactions. The order of transactions on the bus may represent the order that transactions are performed (e.g. for coherency purposes). On the other hand, in distributed systems, nodes may initiate transactions concurrently and use the interconnect to transmit the transactions to other nodes. These transactions may have logical conflicts between them (e.g. coherency conflicts for transactions involving the same address) and may experience resource conflicts (e.g. buffer space may pot be available in various nodes) since no central mechanism for regulating the initiation of transactions is provided. Accordingly, it is more difficult to ensure that information continues to propagate among the nodes smoothly and that deadlock situations (in which no transactions are completed due to conflicts between the transactions) are avoided.

A computer system may include a processing portion with nodes performing processing functions, and an I/O portion with nodes implementing various I/O functions. Two or more of the nodes of the processing portion may be coupled to different memories. The processing portion may operate in a "coherent", fashion such that the processing portion preserves the coherency of data stored within the memories. On the other hand, as no memory is located within the I/O portion, the I/O portion may be operated in a "non-coherent" fashion. Packets used to convey data within the processing and I/O portions need not have the same formats. However, the I/O functions within the I/O portion must be able to generate memory operations (e.g., memory read and write operations) which must be conveyed from the I/O portion into the processing portion. Similarly, the processing functions within the processing portion must be able to generate I/O operations (e.g., I/O read and write operations) which must be conveyed from the processing portion into the I/O portion. It would thus be desirable to have a computer system which implements a system and method for conveying packets between a coherent processing portion of a computer system and a non-coherent I/O portion of the computer system.

SUMMARY OF THE INVENTION

A computer system is presented which implements a system and method for conveying packets between a coherent processing subsystem and a non-coherent input/output (I/O) subsystem. The processing subsystem includes a first processing node coupled to a second processing node via a coherent communication link. The first and second processing nodes may each include a processor preferably executing software instructions (e.g., a processor core configured to execute instructions of a predefined instruction set). The first processing node includes a host bridge which translates packets moving between the processing subsystem and the I/O subsystem. The I/O subsystem includes an I/O node coupled to the first processing node via a non-coherent communication link. In one embodiment, the I/O subsystem includes multiple I/O nodes coupled via non-coherent communication links one after another in series or daisy chain fashion. Each I/O node may embody one or more I/O functions (e.g., modem, sound card, etc.).

The coherent and non-coherent communication links are physically identical. For example, the coherent and non-coherent communication links may have the same electrical interface and the same signal definition. In one embodiment, the coherent and non-coherent communication links are bidirectional communication links made up of two unidirectional sets of transmission media (e.g., wires). Each communication link may include a first set of three unidirectional transmission media directed from a first node to a second node, and a second set of three unidirectional transmission media directed from the second node to the first node.

Both the first and second sets may include separate transmission media for a clock (CLK) signal, a control (CTL) signal, and a command/address/data (CAD) signal. In a preferred embodiment, the CLK signals serves as a clock signal for the CTL and CAD signals. A separate CLK signal may be provided for each 8-bit byte of the CAD signal. The CAD signal is used to convey control packets and data packets. Types of control packets may include command packets and response packets. The CAD signal may be, for example, 8, 16, or 32 bits wide, and may thus include 8, 16, or 32 separate transmission media. The CTL signal may be asserted when the CAD signal conveys a command packet, and may be deasserted when the CAD signal conveys a data packet. The CTL and CAD signals may transmit different information on the rising and falling edges of the CLK signal. Accordingly, two data units may be transmitted in each period of the CLK signal.

The host bridge within the first processing node receives a non-coherent packet from the I/O node via the non-coherent communication link and responds to the non-coherent packet by translating the non-coherent packet to a coherent packet. The host bridge then transmits the coherent packet to the second processing node via the coherent communication link. The coherent and non-coherent packets have identically located command fields, wherein the contents of the command field identifies a command to be carried out. The translating process includes copying the contents of the command field of the non-coherent packet to the command field of the coherent packet.

The coherent packet may also include a destination node field for storing destination node identification information and a destination unit field for storing destination unit identification information. The first processing node may have an address map including a list of address ranges and corresponding node identifiers and unit identifiers. The non-coherent packet may include address information. The translating process may include using the address information to retrieve a destination node identifier and a destination unit identifier from the address map, wherein the destination node identifier identifies the destination node, and wherein the destination unit identifier identifies the destination unit. The translating process may also include storing the destination node identifier within the destination node field of the coherent packet, and storing the destination unit identifier within the destination unit field of the coherent packet.

The coherent packet may also include a source tag field for storing coherent packet identification information. The translating process may include: (i) obtaining a coherent source tag for the coherent packet from the first processing node, wherein the coherent source tag identifies the coherent packet, and (ii) storing the coherent source tag within the source tag field of the coherent packet.

The non-coherent packet may also include a unit identifier which identifies the I/O node as the source of the non-coherent packet, and a non-coherent source tag which identifies the non-coherent packet. The host bridge may include a data buffer. The translating process may include storing the coherent source tag and the corresponding unit identifier and the non-coherent source tag within the data buffer.

The host bridge may receive a coherent packet from the second processing node via the coherent communication link. The host bridge may be configured to respond to the coherent packet by translating the coherent packet to a non-coherent packet and transmitting the non-coherent packet to the I/O node via the non-coherent communication link. Again, the coherent and non-coherent packets have identically located command fields, and the translating process includes copying the contents of the command field of the coherent packet to the command field of the non-coherent packet.

The non-coherent packet may include a unit identification field for storing destination unit identification information, and a source tag field for storing non-coherent packet identification information. The translating process may include using the coherent source tag to obtain a unit identifier and a non-coherent source tag from the data buffer, wherein the unit identifier identifies the I/O node as the destination of the non-coherent packet, and wherein the non-coherent source tag identifies the non-coherent packet. The translating process may also include storing the unit identifier within the unit identification field of the non-coherent packet, and storing the non-coherent source tag within the source tag field of the non-coherent packet.

A first method for use in a computer system includes the host bridge within the first processing node receiving a non-coherent packet from the I/O node via the non-coherent communication link. The host bridge translates the non-coherent packet to a coherent packet, wherein the coherent and non-coherent packets have identically located command fields. As described above, the translating includes copying the contents of the command field of the non-coherent packet to the command field of the coherent packet. The host bridge transmits the coherent packet to the second processing node via the coherent communication link, wherein the coherent and non-coherent communication links are physically identical.

As described above, the translating may also include using address information of the non-coherent packet and the address map described above to determine a destination node identifier and a destination unit identifier of the coherent packet, wherein the destination node identifier identifies the destination node, and wherein the destination unit identifier identifies the destination unit. The translating may also include storing the destination node identifier within the destination node field of the coherent packet, and storing the destination unit identifier within the destination unit field of the coherent packet.

As described above, the translating may also include: (i) obtaining a coherent source tag from the first processing node, wherein the coherent source tag identifies the coherent packet, and (ii) storing the coherent source tag within a source tag field of the coherent packet.

A second method for use in a computer system may include the host bridge receiving a coherent packet from the second processing node via the coherent communication link. The host bridge translates the coherent packet to a non-coherent packet, wherein the coherent and non-coherent packets have identically located command fields. The translating includes copying the contents of the command field of the coherent packet to the command field of the non-coherent packet. The host bridge transmits the non-coherent packet to the I/O node via the non-coherent communication link, wherein the coherent and non-coherent communication links are physically identical.

As described above, the translating may also include using the coherent source tag of the coherent packet to retrieve the unit identifier and the non-coherent source tag from the data buffer within the host bridge, storing the unit identifier within the unit identification field of the non-coherent packet, and storing the non-coherent source tag within the source tag field of the non-coherent packet.

BRIEF DESCRIPTION OF THE DRAWINGS

Other objects and advantages of the invention will become apparent upon reading the following detailed description and upon reference to the accompanying drawings in which:

FIG. 5 is a diagram of an exemplary coherent response packet which may be employed within the processing subsystem;

FIG. 6 is a diagram of an exemplary coherent data packet which may be employed within the processing subsystem;

FIG. 7 is a table listing different types of coherent command packets which may be employed within the processing subsystem;

FIG. 8 is a diagram of an exemplary non-coherent command packet which may be employed within the I/O subsystem;

FIG. 9 is a diagram of an exemplary non-coherent response packet which may be employed within the I/O subsystem;

FIG. 10 is a table listing different types of non-coherent command packets which may be employed within the I/O subsystem;

Figure 1:
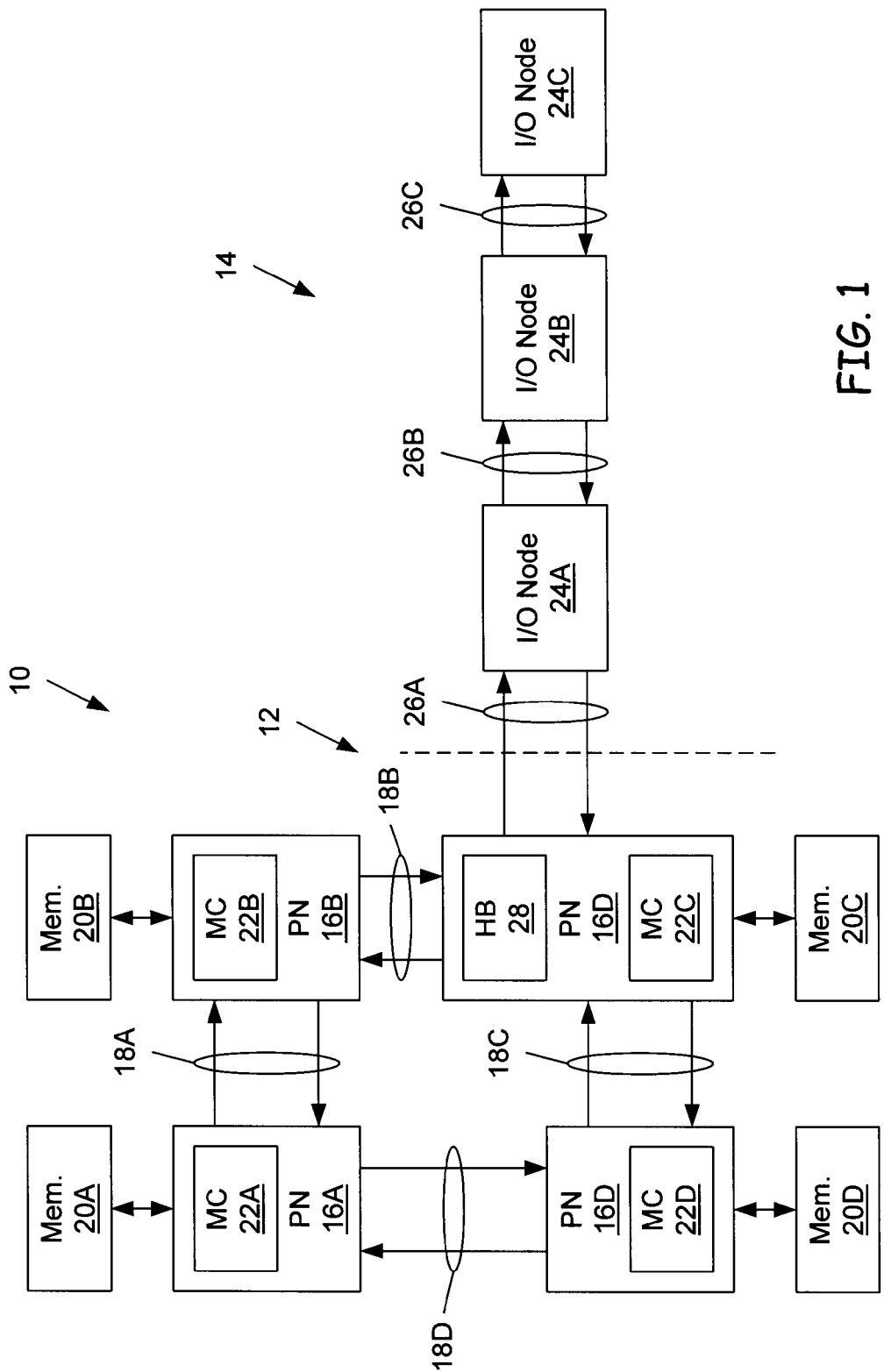
FIG. 1 is a block diagram of one embodiment of a computer system including a processing subsystem and an input/output (I/O) subsystem, wherein the processing subsystem includes several processing nodes, and wherein one of the processing nodes includes a host bridge.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1 is a block diagram of one embodiment of a computer system 10 including a processing subsystem 12 and an input/output (I/O) subsystem 14. Other embodiments of computer system 10 are possible and contemplated. Processing subsystem 12 includes several processing nodes (PN) 16A, 16B, 16C, and 16D. Processing node 16A is coupled to processing node 16B via a bidirectional communication link 18A. Similarly, processing node 16B is coupled to processing node 16C by a bidirectional communication link 18B, processing node 16C is coupled to processing node 16D by a bidirectional communication link 18C, and processing node 16D is coupled to processing node 16A by a bidirectional communication link 18D. As indicated in FIG. 1 and described in more detail below, each bidirectional communication link 18 within processing subsystem 12 may include two unidirectional sets of transmission media (e.g., wires).

Each processing node 16A–16D is coupled to a respective memory 20A–20D via a memory controller (MC) 22A–22D included within each respective processing node 16A–16D. As will be described in more detail below, a memory address space of computer system 10 is assigned across memories 20A–20D such that computer system 10 has a distributed memory system.

I/O subsystem 14 includes several I/O nodes 24A, 24B, and 24C. Each I/O node 24 may embody one or more I/O functions (e.g., modem, sound card, etc.). I/O node 24A is coupled to processing node 16C via a bidirectional communication link 26A. Similarly, I/O node 24B is coupled to I/O node 24A via a bidirectional communication link 26B, and I/O node 24C is coupled to I/O node 24B via a bidirectional communication link 26C. I/O nodes 22A–22C are thus coupled one after another in series or daisy chain fashion. As indicated in FIG. 1 and described in more detail below, each bidirectional communication link 26 within I/O subsystem 14 may include two unidirectional sets of transmission media (e.g., wires).

Figure 2:
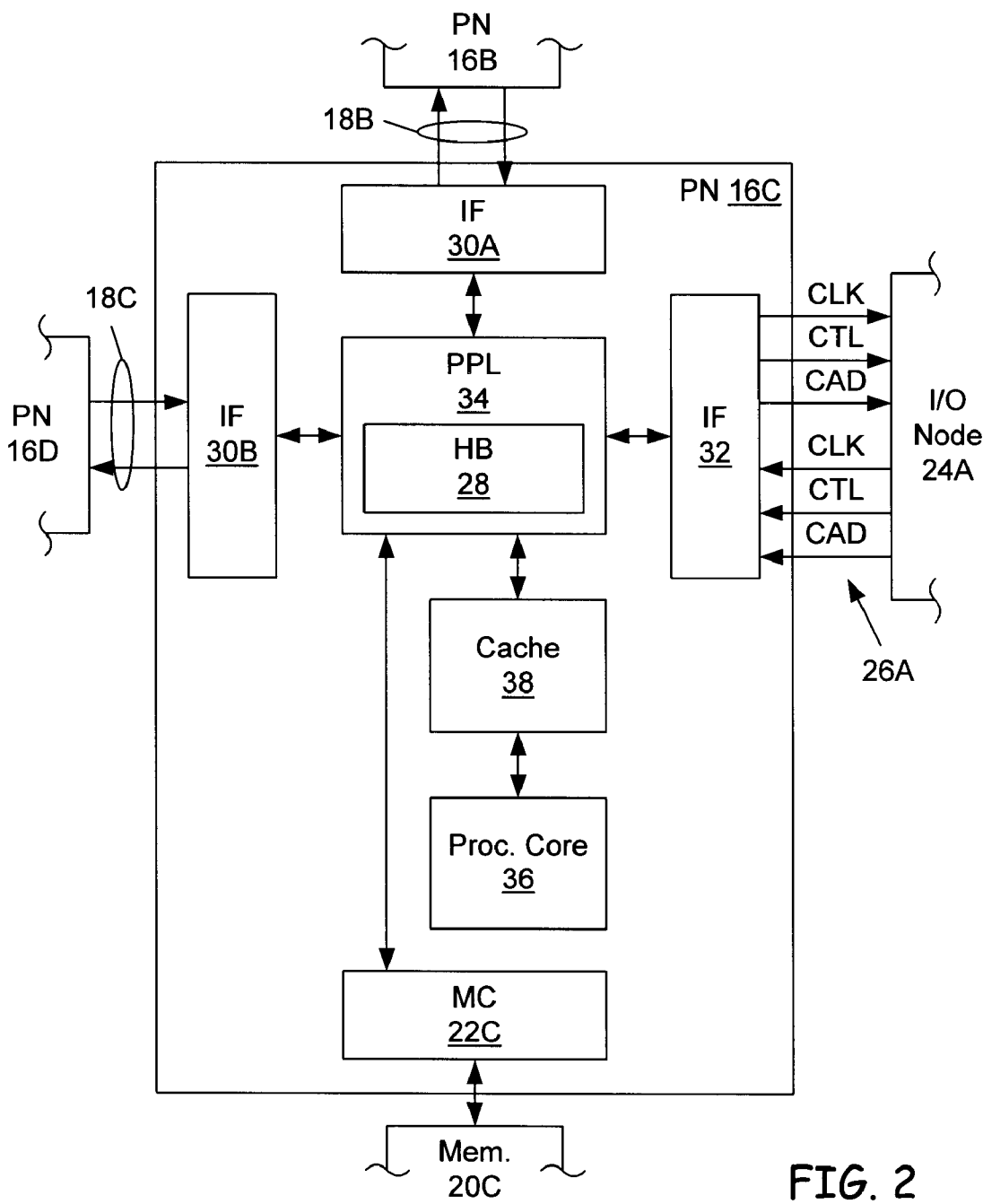
FIG. 2 is a block diagram of one embodiment of the processing node of FIG. 1 including the host bridge.

Processing node 16C includes a host bridge 28 forming an interface between I/O subsystem 14 and processing subsystem 12. FIG. 2 is a block diagram of one embodiment of processing node 16C of FIG. 1. In addition to memory controller 20C, processing node 16C includes a communication interface (IF) 30A coupled to link 18B, a communication interface 30B coupled to link 18C, and a communication interface 32 to link 26A. Processing node 16C communicates with processing nodes 16B and 16D via respective interfaces 30A and 30B, and communicates with I/O node 24A via interface 32. Packet processing logic (PPL) 34 includes host bridge 28, and is coupled to interfaces 30A, 30B, and 32, and to memory controller 22C.

Processing node 16C also includes a processor core 36 coupled to a cache memory 38. Cache 38 is coupled to packet processing logic 34.

Processor core 36 preferably includes circuitry for executing instructions according to a predefined instruction set. For example, the x86 instruction set architecture may be selected. Alternatively, the Alpha, PowerPC, or any other instruction set architecture may be selected. Generally, processor core 36 accesses cache 38 for instructions and data. If needed instructions and/or data is not present within cache 38 (i.e., a cache miss is detected), a read request is generated and transmitted to the memory controller within the processing node to which the missing cache block is mapped.

Each processing node 16 in FIG. 1 may include a processor core similar to processor core 36, a cache similar to cache 38, packet processing logic similar to packet processing logic 34 (minus host bridge 28), and interfaces similar to interfaces 30. Alternately, each processing node 16 may include packet processing logic 34 with host bridge 28, and host bridge 28 in processing nodes 16A, 16B, and 16D may be idle.

Memories 20A–20D in FIG. 1 may include any suitable memory devices. For example, each memory 20 may include one or more RAMBUS DRAMs (RDRAMs), synchronous DRAMs (SDRAMs), static RAM, etc. As described above, the address space of computer system 10 is divided among memories 20A–20D. Each processing node 16A–16D may include an address map used to determine which addresses are mapped to each of the memories 20A–20D, and hence to which processing node 16A–16D a memory request for a particular address should be routed.

Memory controllers 22A–22D coupled to respective memories 20A–20D include control circuitry for interfacing to memories 20A–20D. Memory controllers 22A–22D may include request queues for queuing memory access requests. Where multiple processing nodes 16 include caches similar to cache 38, memory controllers 22A–22D may be responsible for ensuring that memory accesses to respective memories 20A–20D occur in a cache coherent fashion.

As indicated in FIGS. 1 and 2 and described above, bidirectional communication links 18 and 26 may include two unidirectional sets of transmission media (e.g., wires). Communication link 26A in FIG. 2 includes a first set of three unidirectional transmission media directed from interface 32 to I/O node 24A, and a second set of three unidirectional transmission media directed from I/O node 24A to interface 32. Both the first and second sets include separate transmission media for a clock (CLK) signal, a control (CTL) signal, and a command/address/data (CAD) signal. In a preferred embodiment, the CLK signals serves as a clock signal for the CTL and CAD signals. A separate CLK signal may be provided for each 8-bit byte of the CAD signal. The CAD signal is used to convey control packets and data packets. Types of control packets include command packets and response packets. The CAD signal may be, for example, 8, 16, or 32 bits wide, and may thus include 8, 16, or 32 separate transmission media.

The CTL signal is asserted when the CAD signal conveys a command packet, and is deasserted when the CAD signal conveys a data packet. The CTL and CAD signals may transmit different information on the rising and falling edges of the CLK signal. Accordingly, two data units may be transmitted in each period of the CLK signal. Communication link 26A in FIG. 2 and described above is preferably typical of communication links 18 within processing subsystem 12 and communication links 26 within I/O subsystem 14.

Processing nodes 16A–16D implement a packet-based link for inter-processing node communication. Communication links 18 are used to transmit packets between processing nodes 16 within processing subsystem 12, and are operated in a "coherent" fashion such that processing subsystem 12 preserves the coherency of data stored within memories 20A–20D and the caches of processing nodes 16A–16D.

I/O nodes 24A–24C also implement a packet-based link for inter-I/O node communication. Communication links 26B and 26C are used to transmit packets between I/O nodes 24 within I/O subsystem 14, and communication link 26A is used to transmit packets between I/O node 24A and processing node 16C. Communication links 26A–26C are operated in a "non-coherent" fashion as system memory is not distributed within I/O subsystem 14.

Interface logic used within computer system 10 (e.g., interface logic 30A–30B and 32) may include buffers for receiving packets from a communication link and for buffering packets to be transmitted upon the communication link. Computer system 10 may employ any suitable flow control mechanism for transmitting packets. For example, interface logic within each node may store a count of the number of each type of buffer within interface logic of a receiver node at the other end of a communication link. A sending node may not transmit a packet unless the receiving node has a free buffer of the correct type for storing the packet. As each buffer is freed within the receiving node (e.g., by forwarding a stored packet), the receiving node transmits a message to the sending node indicating that the buffer has been freed. Such a mechanism may be referred to as a "coupon-based" system.

A packet transmitted within computer system 10 may pass through one or more intermediate processing and/or I/O nodes. For example, a packet transmitted by processing node 16A to processing node 16C within processing subsystem 12 may pass through either processing node 16B or processing node 16D. (See FIG. 1.) Any suitable packet routing algorithm may be used within processing subsystem 12. Packets transmitted within I/O subsystem 14 are either transmitted in a direction toward processing node 16C (i.e., "upstream") or in a direction away from processing node 16C. (i.e., "downstream"), and may pass through one or more intermediate I/O nodes 24. For example, a packet transmitted by I/O node 24C to I/O node 24A passes through I/O node 24B. Other embodiments of computer system 10 may include more or fewer processing nodes 16 and/or I/O nodes 24 than the embodiment of FIG. 1.

The coherent packets used within processing subsystem 12 and the non-coherent packets used in I/O subsystem 14 may have different formats, and relay include different data. As will be described in more detail below, host bridge 28 within processing node 16C translates packets moving from one subsystem to the other. For example, a non-coherent packet transmitted by I/O node 24B and having a target within processing node 16A passes through I/O node 24A to processing node 16C. Host bridge 28 within processing node 16C translates the non-coherent packet to a corresponding coherent packet. Processing node 16C may transmit the coherent packet to either processing node 16B or processing node 16D. If processing node 16C transmits the coherent packet to processing node 16B, processing node 16B may receive the packet, then forward the packet to processing node 16A. On the other hand, if processing node 16C transmits the coherent packet to processing node 16D, processing node 16D may receive the packet, then forward the packet to processing node 16A.

Coherent Packets within Processing Subsystem 12

Figure 3:
FIG. 3 is a diagram of an exemplary coherent information packet which may be employed within the processing subsystem.
Figure 4:
FIG. 4 is a diagram of an exemplary coherent command packet which may be employed within the processing subsystem.

FIGS. 3–6 illustrate exemplary coherent packet formats which may be employed within processing subsystem 12. FIGS. 3–5 illustrate exemplary coherent control packets and FIG. 6 illustrates an exemplary coherent data packet. A control packet is a packet carrying control information regarding the transaction. Types of coherent control packets include information (info) packets, command packets, and response packets. Certain control packets specify that a data packet follows. The data packet carries data associated with the transaction and the preceding control packet. Other embodiments may employ different packet formats.

The exemplary packet formats of FIGS. 3–6 show the contents of bits 7–0 of 8-bit bytes transmitted in parallel during consecutive "bit times". The amount of time used to transmit each data unit of a packet (e.g., byte) is referred to herein as a "bit time". Each bit time is a portion of a period of the CLK signal. For example, within a single period of the CLK signal, a first byte may be transmitted on a rising edge of the CLK signal, and a different byte may be transmitted on the falling edge of the CLK signal. In this case, the bit time is half the period of the CLK signal. Bit times for which no value is provided in the figures may either be reserved for a given packet, or may be used to transmit packet-specific information. Fields indicated by dotted lines indicate optional fields which may not be included in all of the packets of a certain type.

FIG. 3 is a diagram of an exemplary coherent information (info) packet 40 which may be employed within processing subsystem 12. Info packet 40 includes 4 bit times on an 8-bit coherent communication link. A 6-bit command field Cmd[5:0] is transmitted during the first bit time. The control packets of FIGS. 4 and 5 include a similar command encoding in the same bit positions during bit time 1. Info packet 40 may be used to transmit messages between processing nodes when the messages do not include a memory address. Additionally, info packets may be used to transmit the messages indicating the freeing of buffers in the coupon-based flow control scheme described above.

FIG. 4 is a diagram of an exemplary coherent command packet 42 which may be employed within processing subsystem 12. Command packet 42 comprises 8 bit times on an 8-bit coherent communication link. Command packet 42 may be used to initiate a transaction (e.g. a read or write transaction), as well as to transmit commands in the process of carrying out the transaction for those commands which carry the memory address affected by the transaction. Generally, a command packet indicates an operation to be performed by the destination node.

The bits of a command field Cmd[5:0] identifying the type of command are transmitted during bit time 1. Bits of a source unit field SrcUnit[1:0] containing a value identifying a source unit within the source node are also transmitted during bit time 1. Types of units within computer system 10 may include memory controllers, caches, processors, etc. Bits of a source node field SrcNode[2:0] containing a value identifying the source node are transmitted during bit time 2. Bits of a destination node field DestNode[2:0] containing a value which uniquely identifies the destination node may also be transmitted during the second bit time, and may be used to route the packet to the destination node. Bits of a destination unit field DestUnit[1:0] containing a value identifying the destination unit within the destination node which is to receive the packet may also be transmitted during the second bit time.

Many command packets may also include bits of a source tag field SrcTag[4:0] in bit time 3 which, together with the source node field SrcNode[2:0] and the source unit field SrcUnit[1:0], may link the packet to a particular transaction of which it is a part. Bit time 4 may be used in some commands to transmit the least significant bits of the memory address affected by the transaction. Bit times 5–8 are used to transmit the bits of an address field Addr[39:8] containing the most significant bits of the memory address affected by the transaction. Some of the undefined fields in packet 42 may be used in various command packets to carry packet-specific information.

FIG. 5 is a diagram of an exemplary coherent response packet 44 which may be employed within processing subsystem 12. Response packet 44 includes the command field Cmd[5:0], the destination node field DestNode[2:0], and the destination unit field DestUnit[1:0]. The destination node field DestNode[2:0] identifies the destination node for the response packet (which may, in some cases, be the source node or target node of the transaction). The destination unit field DestUnit[1:0] identifies the destination unit within the destination node. Various types of response packets may include additional information. For example, a read response packet may indicate the amount of read data provided in a following data packet. Probe responses may indicate whether or not a copy of the requested cache block is being retained by the probed node (using the optional shared bit "Sh" in bit time 4).

Generally, response packet 44 is used for commands during the carrying out of a transaction which do not require transmission of the memory address affected by the transaction. Furthermore, response packet 44 may be used to transmit positive acknowledgement packets to terminate a transaction. Similar to the command packet 42, response packet 44 may include the source node field SrcNode[2:0], the source unit field SrcUnit[1:0], and the source tag field SrcTag[4:0] for many types of responses (illustrated as optional fields in FIG. 5).

FIG. 6 is a diagram of an exemplary coherent data packet 46 which may be employed within processing subsystem 12. Data packet 46 of FIG. 6 includes 8 bit times on an 8-bit coherent communication link. Data packet 46 may comprise different numbers of bit times dependent upon the amount of data being transferred. For example, in one embodiment a cache block comprises 64 bytes and hence 64 bit times on an eight bit link. Other embodiments may define a cache block to be of a different size, as desired. Additionally, data may be transmitted in less than cache block sizes for noncacheable reads and writes. Data packets for transmitting data less than cache block size employ fewer bit times. In one embodiment, non-cache block sized data packets may transmit several bit times of byte enables prior to transmitting the data to indicate which data bytes are valid within the data packet. Furthermore, cache block data may be returned as an 8-byte quadword addressed by the least significant bit of the request address first, followed by interleaved return of the remaining quadwords.

FIGS. 3–6 illustrate packets for 8-bit coherent communication links. Packets for 16 and 32 bit links may be formed by concatenating consecutive bit times of FIGS. 3–6. For example, bit time 1 of a packet on a 16-bit link may comprise the information transmitted during bit times 1 and 2 on the 8-bit link. Similarly, bit time 1 of the packet on a 32-bit link may comprise the information transmitted during bit times 1–4 on the 8-bit link.

FIG. 7 is a table 48 listing different types of coherent command packets which may be employed within processing subsystem 12. Other embodiments of processing subsystem 12 are possible and contemplated, and may include other suitable sets of command packets and command field encodings. Table 48 includes a command code column including the contents of command field Cmd[5:0] for each coherent command packet, a command column naming the command, and a packet type column indicating which of coherent command packets 40, 42, and 44 (and data packet 46, where specified) is employed for that command.

A read transaction may be initiated using a sized read (ReadSized) command, a read block (RdBlk) command, a read block shared (RdBlkS) command, or a read block with modify (RdBlkMod) command. The ReadSized command is used for non-cacheable reads or reads of data other than a cache block in size. The amount of data to be read is encoded into the ReadSized command packet. For reads of a cache block, the RdBlk command may be used unless: (i) a writeable copy of the cache block is desired, in which case the RdBlkMod command may be used; or (ii) a copy of the cache block is desired but no intention to modify the block is known, in which case the RdBlkS command may be used. The RdBlkS command may be used to make certain types of coherency schemes (e.g. directory-based coherency schemes) more efficient.

In general, the appropriate read command is transmitted from the source node initiating the transaction to a target node which owns the memory corresponding to the cache block. The memory controller in the target node transmits Probe commands (indicating return of probe responses to the source of the transactions) to the other nodes in the system to maintain coherency by changing the state of the cache block in those nodes and by causing a node including an updated copy of the cache block to send the cache block to the source node. Each node receiving a Probe command transmits a probe response (ProbeResp) packet to the source node.

If a probed node has a modified copy of the read data (i.e. dirty data), that node transmits a read response (RdResponse) packet and the dirty data to the source node. A node transmitting dirty data may also transmit a memory cancel (MemCancel) response packet to the target node in an attempt to cancel transmission by the target node of the requested read data. Additionally, the memory controller in the target node transmits the requested read data using a RdResponse response packet followed by the data in a data packet.

If the source node receives a RdResponse response packet from a probed node, the received read data is used. Otherwise, the data from the target node is used. Once each of the probe responses and the read data is received in the source node, the source node transmits a source done (SrcDone) response packet to the target node as a positive acknowledgement of the termination of the transaction.

A write transaction may be initiated using a sized write (WrSized) command or a victim block (VicBlk) command followed by a corresponding data packet. The WrSized command is used for non-cacheable writes or writes of data other than a cache block in size. To maintain coherency for WrSized commands, the memory controller in the target node transmits Probe commands (indicating return of probe response to the target node of the transaction) to each of the other nodes in the system. In response to Probe commands, each probed node transmits a ProbeResp response packet to the target node. If a probed node is storing dirty data, the probed node responds with a RdResponse response packet and the dirty data. In this manner, a cache block updated by the WrSized command is returned to the memory controller for merging with the data provided by the WrSized command. The memory controller, upon receiving probe responses from each of the probed nodes, transmits a target done (TgtDone) response packet to the source node to provide a positive acknowledgement of the termination of the transaction. The source node replies with a SrcDone response packet.

A victim cache block which has been modified by a node and is being replaced in a cache within the node is transmitted back to memory using the VicBlk command. Probes are not needed for the VicBlk command. Accordingly, when the target memory controller is prepared to commit victim block data to memory, the target memory controller transmits a TgtDone response packet to the source node of the victim block. The source node replies with either a SrcDone response packet to indicate that the data should be committed or a MemCancel response packet to indicate that the data has been invalidated between transmission of the VicBlk command and receipt of the TgtDone response packet (e.g. in response to an intervening probe).

A change to dirty (ChangetoDirty) command packet may be transmitted by a source node in order to obtain write permission for a cache block stored by the source node in a non-writeable state. A transaction initiated with a ChangetoDirty command may operate similar to a read except that the target node does not return data. A validate block (ValidateBlk) command may be used to obtain write permission to a cache block not stored by a source node if the source node intends to update the entire cache block. No data is transferred to the source node for such a transaction, but otherwise operates similar to a read transaction.

A target start (TgtStart) response may be used by a target to indicate that a transaction has been started (e.g. for ordering of subsequent transactions). A no operation (Nop) info packet may be used to transfer flow control information between nodes (e.g., buffer free indications). A Broadcast command may be used to broadcast messages between nodes (e.g., to distribute interrupts). Finally, a synchronization (Sync) info packet may be used to synchronize node operations (e.g. error detection, reset, initialization, etc.).

Table 48 of FIG. 7 also includes a virtual channel Vchan column. The Vchan column indicates the virtual channel in which each packet travels (i.e. to which each packet belongs). In the present embodiment, four virtual channels are defined: a nonposted command (NPC) virtual channel, a posted command (PC) virtual channel, response (R) virtual channel, and a probe (P) virtual channel.

Generally speaking, a "virtual channel" is a communication path for carrying packets between various processing nodes. Each virtual channel is resource-independent of the other virtual channels (i.e. packets flowing in one virtual channel are generally not affected, in terms of physical transmission, by the presence or absence of packets in another virtual channel). Packets are assigned to a virtual channel based upon packet type. Packets in the same virtual channel may physically conflict with each other's transmission (i.e. packets in the same virtual channel may experience resource conflicts), but may not physically conflict with the transmission of packets in a different virtual channel.

Certain packets may logically conflict with other packets (i.e. for protocol reasons, coherency reasons, or other such reasons, one packet may logically conflict with another packet). If a first packet, for logical/protocol reasons, must arrive at its destination node before a second packet arrives at its destination node, it is possible that a computer system could deadlock if the second packet physically blocks the first packet's transmission (by occupying conflicting resources). By assigning the first and second packets to separate virtual channels, and by implementing the transmission medium within the computer system such that packets in separate virtual channels cannot block each other's transmission, deadlock-free operation may be achieved. It is noted that the packets from different virtual channels are transmitted over the same physical links (e.g. lines 24 in FIG. 1). However, since a receiving buffer is available prior to transmission, the virtual channels do not block each other even while using this shared resource.

Each different packet type (e.g. each different command field Cmd[5:0]) could be assigned to its own virtual channel. However, the hardware to ensure that virtual channels are physically conflict-free may increase with the number of virtual channels. For example, in one embodiment, separate buffers are allocated to each virtual channel. Since separate buffers are used for each virtual channel, packets from one virtual channel do not physically conflict with packets from another virtual channel (since such packets would be placed in the other buffers). It is noted, however, that the number of required buffers increases with the number of virtual channels. Accordingly, it is desirable to reduce the number of virtual channels by combining various packet types which do not conflict in a logical/protocol fashion. While such packets may physically conflict with each other when travelling in the same virtual channel, their lack of logical conflict allows for the resource conflict to be resolved without deadlock. Similarly, keeping packets which may logically conflict with each other in separate virtual channels provides for no resource conflict between the packets. Accordingly, the logical conflict may be resolved through the lack of resource conflict between the packets by allowing the packet which is to be completed first to make progress.

In one embodiment, packets travelling within a particular virtual channel on the coherent link from a particular source node to a particular destination node remain in order. However, packets from the particular source node to the particular destination node which travel in different virtual channels are not ordered. Similarly, packets from the particular source node to different destination nodes, or from different source nodes to the same destination node, are not ordered (even if travelling in the same virtual channel).

Packets travelling in different virtual channels may be routed through computer system 10 differently. For example, packets travelling in a first virtual channel from processing node 16A to processing node 16C may pass through processing node 16B, while packets travelling in a second virtual channel from processing node 16A to processing node 16C may pass through processing node 16D. Each node may include circuitry to ensure that packets in different virtual channels do not physically conflict with each other.

A given write operation may be a "posted" write operation or a "non-posted" write operation. Generally speaking, a posted write operation is considered complete by the source node when the write command and corresponding data are transmitted by the source node (e.g., by an interface within the source node). A posted write operation is thus in effect completed at the source. As a result, the source node may continue with other operations while the packet or packets of the posted write operation travel to the target node and the target node completes the posted write operation. The source node is not directly aware of when the posted write operation is actually completed by the target node. It is noted that certain deadlock conditions may occur in Peripheral Component Interconnect (PCI) I/O systems if posted write operations are not allowed to become unordered with respect to other memory operations.

In contrast, a non-posted write operation is not considered complete by the source node until the target node has completed the non-posted write operation. The target node generally transmits an acknowledgement to the source node when the non-posted write operation is completed. It is noted that such acknowledgements consume interconnect bandwidth and must be received and accounted for by the source node. Non-posted write operations may be required when the write operations must be performed in a particular order (i.e., serialized).

A non-posted WrSized command belongs to the NPC virtual channel, and a posted WrSized command belongs to the PC virtual channel. In one embodiment, bit 5 of the command field Cmd[5:0] is used to distinguish posted writes and non-posted writes. Other embodiments may use a different field to specify posted vs. non-posted writes. It is noted that info packets are used to communicate between adjacent nodes, and hence may not be assigned to virtual channels in the present embodiment.

Non-Coherent Packets within I/O Subsystem 14

FIG. 8 is a diagram of an exemplary non-coherent command packet 50 which may be employed within I/O subsystem 14. Command packet 50 includes command field Cmd[5:0] similar to command field Cmd[5:0] of the coherent packet. Additionally, an optional source tag field SrcTag[4:0], similar to the source tag field SrcTag[4:0] of the coherent command packet, may be transmitted in bit time 3. The address may be transmitted in bit times 5–8 (and optionally in bit time 4 for the least significant address bits).

A unit ID field UnitID[4:0] replaces the source node field SrcNode[4:0] of the coherent command packet. Unit IDs serve to identify packets as coming from the same logical source (if the unit IDs are equal). However, an I/O node may have multiple unit IDs (for example, if the node includes multiple devices or functions which are logically separate). Accordingly, a node may accept packets having more than one unit ID. Additionally, since packets flow between host bridge 28 and I/O nodes 24A–24C, the fact that host bridge 28 is either the source or destination of each packet may be implied within the non-coherent packets. Accordingly, a single unit ID may be used in the non-coherent packets. In one embodiment, the unit ID may comprise 5 bits. Unit ID "00000" (0) may be assigned to the host bridge, and unit ID "11111" (31) may be used for error cases. Accordingly, up to 30 unit IDs may exist within I/O subsystem 14.

Additionally, command packet 50 includes a sequence ID field SeqID[3:0] transmitted in bit times 1 and 2. The sequence ID field SeqID[3:0] may be used to group a set of two or more command packets from the same unit ID and indicate that the set is ordered. A sequence ID field SeqID[3:0] value of zero may be used to indicate that the packet is unordered. A non-zero value within the sequence ID field SeqID[3:0] may be used to indicate the ordering of the packet with respect to other packets of the same transaction.

Command packet 50 also includes a pass posted write PassPW bit transmitted in bit time 2. The Pass PW bit determines whether command packet 50 is allowed to pass posted writes from the same unit ID. If the pass posted write bit is zero or clear, the packet is not allowed to pass a prior posted write. If the pass posted write bit is one or set, the packet is allowed to pass prior posted writes. For read packets, the command field Cmd[5:0] includes a bit (e.g. bit 3) which is defined as the "responses may pass posted writes" bit. That bit becomes the PassPW bit in the response packet corresponding to the read.

FIG. 9 is a diagram of an exemplary non-coherent response packet 52 which may be employed within I/O subsystem 14. Response packet 52 includes the command field Cmd[5:0], the unit ID field UnitID[4:0], the source tag field SrcTag[4:0], and the PassPW bit similar to command packet 50 described above. Other bits may be included in response packet 52 as needed.

FIG. 10 is a table 54 listing different types of non-coherent command packets which may be employed within I/O subsystem 14. Other embodiments of I/O subsystem 14 are possible and contemplated, and may include other suitable sets of packets and command field encodings. Table 54 includes a command (CMD) code column listing contents of command field Cmd[5:0] for each non-coherent command, a virtual channel (Vchan) column defining the virtual channel to which the non-coherent packets belong, a command column naming the command, and a packet type column indicating which of command packets 40, 50, and 52 is employed for that command.

The Nop, WrSized, ReadSized, RdResponse, TgtDone, Broadcast, and Sync packets may be similar to the corresponding coherent packets described with respect to FIG. 7. However, within I/O system 14, neither probe command nor probe response packets are issued. Posted/non-posted write operations may again be identified by the value of bit 5 of the WrSized command, as described above, and TgtDone response packets may not be issued for posted writes.

A Flush command may be issued by an I/O node 24 to ensure that one or more previously performed posted write commands have completed on the target interface. Generally, since posted commands are completed (e.g. receive the corresponding TgtDone response) on the source node interface prior to completing the command on the target node interface, the source node cannot determine when the posted commands have been flushed to their destination within the target node interface. Executing a Flush command (and receiving the corresponding TgtDone response packet) provides a means for the source node to determine that previous posted commands have been flushed to their destinations.

Assign and assign acknowledge (AssignAck) packets are used to assign Unit IDs to I/O nodes 24. Host bridge 28 transmits an Assign command packet to each I/O node 24 in sequence, the Assign command packet indicating the last used Unit ID. The receiving I/O node 24 assigns the number of Unit IDs required by that node, starting at the last used Unit ID+1. The receiving I/O node returns the AssignAck packet, including an ID count indicating the number of Unit IDs assigned.

Packet Translation

The coherent information, command, and response packets of respective FIGS. 3–5 and the non-coherent command and response packets of respective FIGS. 8 and 9 all share common characteristics which facilitate packet translation. For example, they all contain the 6-bit command field Cmd[5:0] at the same location within the packets (i.e., bits 0–5 of the first byte comprising a bit time). Further, the encodings of the command field Cmd[5:0] within the packets are identical. For example, according to FIGS. 7 and 10, the command field Cmd[5:0] encoding of x01xxx is used to denote a sized write command packet in both the coherent and non-coherent packet formats. Bit [5] of Cmd[5:0] may determine if the write command is posted or non-posted in both the coherent and non-coherent packet formats. For example, when Cmd[5:0] contains 001xxx, the packet may be a non-posted write command packet, and when Cmd[5:0] contains 101xxx, the packet may be a posted write command packet. As a result, translating a coherent packet to a non-coherent packet may include copying the contents of the command field Cmd[5:0] within the coherent packet to an identically located command field Cmd[5:0] within the non-coherent packet. Similarly, translating a non-coherent packet to a coherent packet may include copying the contents of the command field Cmd[5:0] within the non-coherent packet to an identically located command field Cmd[5:0] within the coherent packet.

Figure 11:
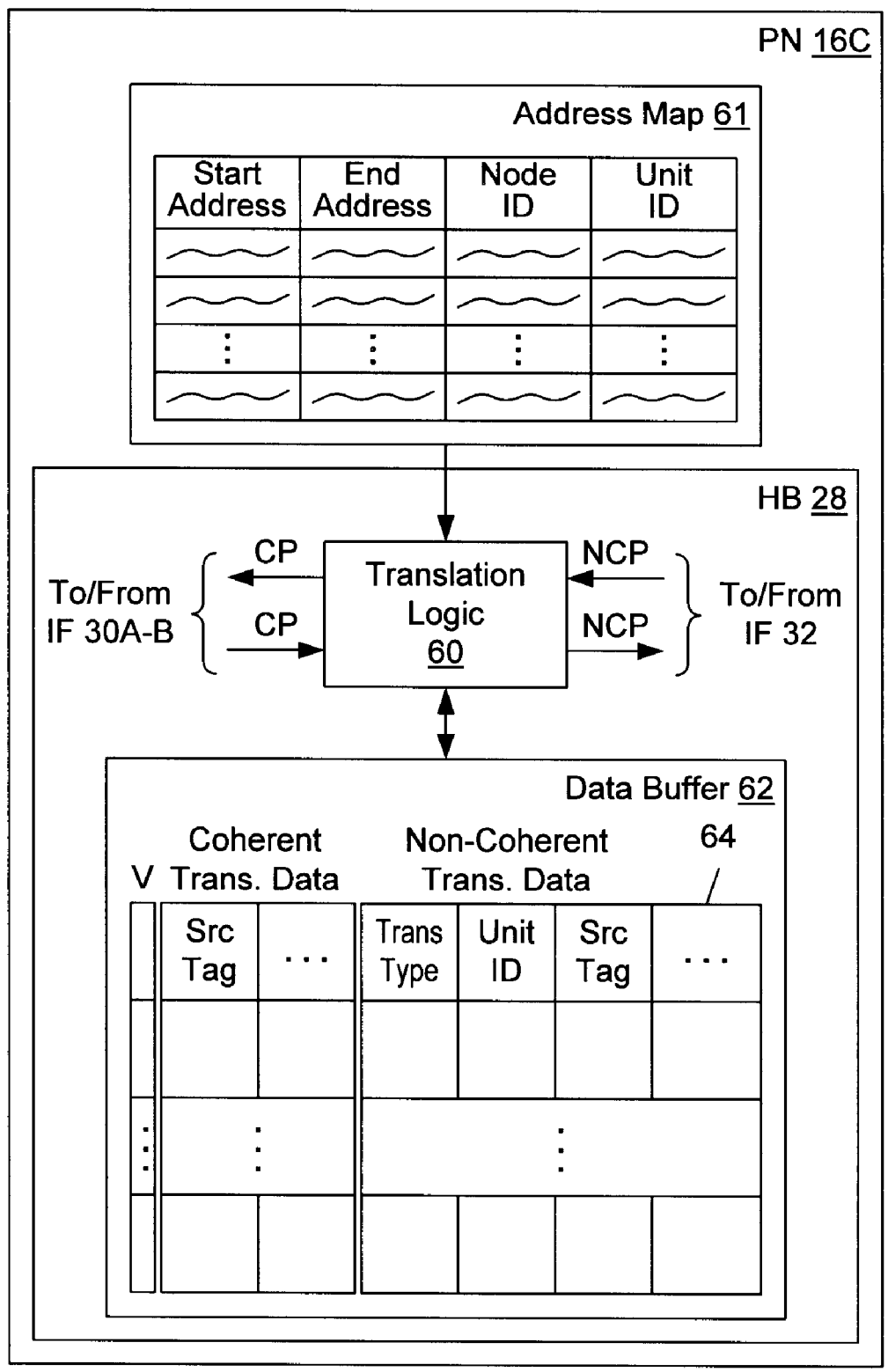
FIG. 11 is a diagram of one embodiment of the processing node of FIGS. 1 and 2 including the host bridge.

FIG. 11 is a diagram of one embodiment of processing node (PN) 16C of FIGS. 1 and 2. In the embodiment of FIG. 11, processing node 16C includes host bridge 28, wherein host bridge 28 includes translation logic 60 coupled to an address map 61 a data buffer 62. Translation logic 60 translates non-coherent packets (NCPs), sourced within I/O subsystem 14 and having a target within processing subsystem 12, to corresponding coherent packets (CPs). Translation logic 60 also translates coherent packets, sourced within processing subsystem 12 and having a target within I/O subsystem 14, to corresponding non-coherent packets. Translation logic 60 may store coherent and/or non-coherent data associated with transactions sourced in one subsystem and having a target in the other subsystem within data buffer 62.

As described above, each processing node 16A–16D may include an address map used to determine which addresses are mapped to each of the memories 20A–20D. Address map 61 within processing node 16C is one embodiment of such an address map. Address map 61 includes multiple entries each including a Start Address field, an End Address field, a Node ID field, and a Unit ID field. A given Start Address field contains the starting address of a block of memory locations within a memory. The End Address field contains the ending address of the block of memory locations. Together, the contents of the Start Address field and the End Address field define an address range of the block of memory locations. The Node ID field contains the node ID of the processing node coupled to the memory, and the Unit ID field contains the unit ID of the device (e.g., the memory controller) which handles accesses to the block of memory locations.

Data buffer 62 may store the transaction data in the form of a table 64 having multiple entries. Each entry may include a valid bit V, a SOURCE TAG field in a portion of table 64 associated with coherent transaction data, and a TRANSACTION TYPE, UNIT ID, and SOURCE TAG fields in a portion of table 64 associated with non-coherent transaction data. Valid bit V may indicate whether the corresponding entry is valid. For example, valid bit V may have a value of "1" if the corresponding entry is valid, and may have a value of "0" if the corresponding entry is invalid. The SOURCE TAG field in the portion of table 64 associated with coherent transaction data may be used to store a source tag of processing node 16C assigned to the coherent transaction by host bridge 28. The TRANSACTION TYPE field may contain a value indicating the type of transaction. The UNIT ID field may contain a value identifying an I/O node source of the transaction. The SOURCE TAG field in the portion of table 64 associated with non-coherent transaction data may be used to store a source tag of processing node 16C assigned to the non-coherent transaction by a source I/O node. As indicated in FIG. 11 and described below, other transaction information may be stored within table 64.

In a first example, assume I/O node 24A of FIG. 1 produces a write transaction directed to a memory location within memory 20D coupled to processing node 16D. I/O node 24A produces the write transaction as a non-coherent sized write (NSW) transaction. The NSW transaction includes a non-coherent sized write command packet followed by a data packet. I/O node 24A transmits the packets of the NSW transaction upstream to processing node 16C via non-coherent communication link 26A. Interface 32 of processing node 16C receives the packets of the NSW transaction and provides the information Contained within the packets of the NSW transaction to packet processing logic 34. Host bridge 28 within packet processing logic 34 uses the address of the memory location and address map 61 described above to determine that processing node 16D is the target. Translation logic 60 of host bridge 28 translates the NSW transaction to a coherent sized write (CSW) transaction with processing node 16D as the target node. Translation logic 60 may also translate the NSW data packet to a CSW data packet.

Figure 12:
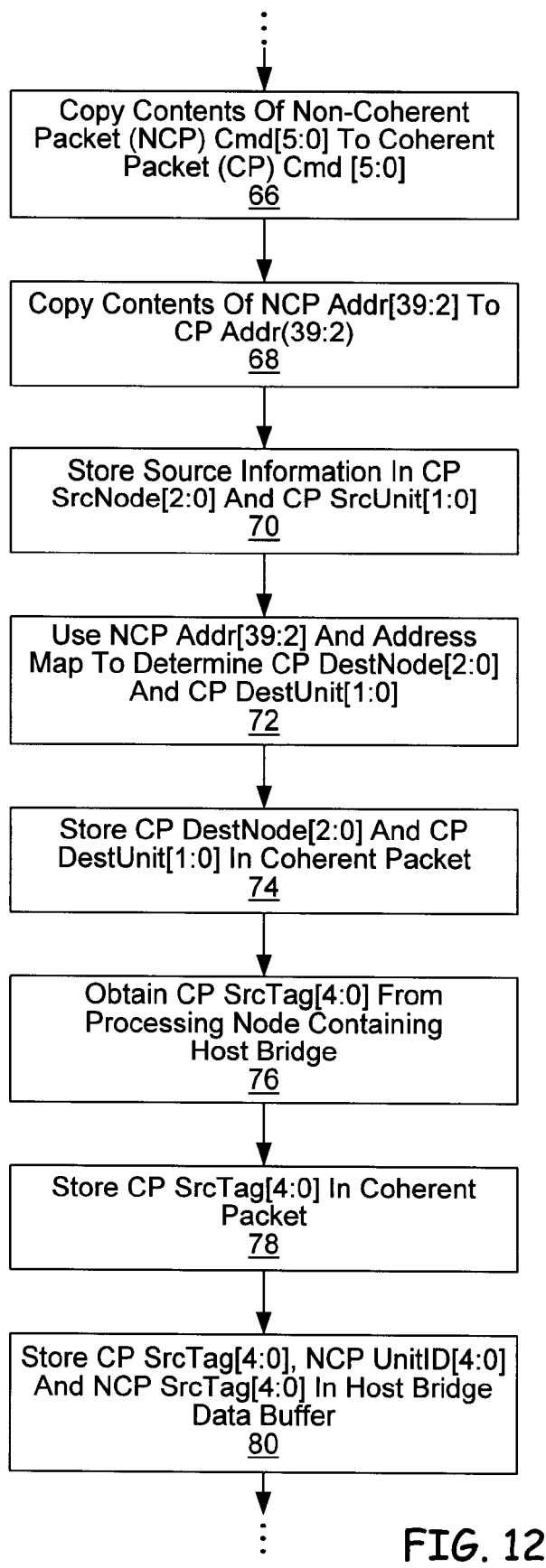
FIG. 12 is a flow chart of one implementation of a method for translating a non-coherent command packet to a coherent command packet.

FIG. 12 is a flow chart of one implementation of a method for translating a non-coherent command packet to a coherent command packet. Translation logic 60 may embody the method of FIG. 12. During a first step 66, translation logic 60 copies the contents of the command field Cmd[5:0] of the NSW command packet to the command field Cmd[5:0] of the CSW command packet. It is noted that locations of the command fields Cmd[5:0] within the NSW and CSW command packets are identical as shown in FIGS. 4 and 8.

Translation logic 60 copies the contents of address field Addr[39:32] of the NSW command packet to the corresponding address field Addr[39:2] of the CSW command packet during a second step 68. During a third step 70, translation logic 60 stores the node ID of processing node 16C within the source node field SrcNode[2:0] and the unit ID of host bridge 28 within the source unit field SrcUnit[1:0] of the CSW command packet.

Translation logic 60 uses the contents of the address field Addr[39:32] of the NSW command packet and address map 61 to determine the contents of the destination node field D, stNode[2:0] and the destination unit field DestUnit[1:0] of the CSW command packet during a step 72. Translation logic 60 may search the Start Address and End Address fields of address map 61 to locate an entry of address map 61 wherein the contents of the address field Addr[39:32] of the NSW command packet are: (i) greater than or equal to the contents of the Start Address field, and (ii) less than or equal to the contents of the End Address field. Once translation logic 60 locates such an entry, translation logic 60 may copy the contents of the Node ID field of the entry to the destination node field DestNode[2:0] of the CSW command packet, and copy the contents of the Unit ID field of the entry to the destination unit field DestUnit[1:0] of the CSW command packet, during a step 74. In this example, translation logic 60 stores the node ID of processing node 16D in destination node field DestNode[2:0], and the unit ID of memory controller 22D within the destination unit field DestUnit[1:0].

During a step 76, translation logic 60 obtains a source tag identifying the CSW command packet from processing node 16C. Translation logic 60 stores the source tag within source tag field SrcTag[4:0] of the CSW command packet during a step 78.

During a step 80, translation logic 60 stores coherent and non-coherent data associated with the write transaction within data buffer 62. Translation logic 60 may use the contents of Cmd[5:0] of the NSW command packet to determine the type of transaction, and may assign a corresponding value to a TRANSACTION TYPE identifier. It is noted that translation logic 60 distinguishes between posted and non-posted first write transactions, and assigns different values to the TRANSACTION TYPE identifier in each case. Translation logic 60 may provide the contents of SrcTag[4:0] of the CSW command packet, the contents of SrcTag[4:0] assigned to the NSW command packet, the TRANS-ACTION TYPE identifier, and the contents of the unit ID field UnitID[4:0] of the NSW command packet to data buffer 62. Data buffer 62 may store the contents of SrcTag[4:0] of the CSW command packet within the SOURCE TAG field of the coherent transaction data portion of an available (e.g., invalid) entry within table 64. Data buffer 62 may store the value of the TRANSACTION TYPE identifier within the TRANSACTION TYPE field of the entry, and the contents of the unit ID field UnitID[4:0] within the UNIT ID field of the entry. Data buffer 62 may also store the contents of SrcTag[4:0] of the NSW command packet within the SOURCE TAG field of the non-coherent transaction data portion of the entry. Data buffer 62 may also set valid bit V of the entry to "1" to indicate that the entry is valid.

Referring back to FIG. 2, host bridge 28 provides the packets of the CSW transaction (i.e., the CSW command packet and the CSW data packet) to packet processing logic 34 for issuance. Packet processing logic 34 provides the packets of the CSW transaction to interface 30B. Interface 30B transmits the packets of the CSW transaction to processing node 16D via communication link 18C. The packet processing logic of processing node 16D uses the contents of the destination node field DestNode[2:0] and the destination unit field DestUnit[1:0] to determine that memory controller 22D is to receive the first write transaction, and provides the information contained within the packets of the first write transaction to memory controller 22D.

Memory controller 22D properly orders the CSW operation with respect to other pending operations within memory controller 22D, and ensures that a correct coherency state with respect to CSW is established within the other processing nodes 16A–16C. At this time, the CSW transaction has reached a "point of coherency" within processing subsystem 12. If the CSW transaction is a non-posted sized write transaction, memory controller 22D transmits a coherent target done (CTD) response packet to host bridge 28.

Figure 13:
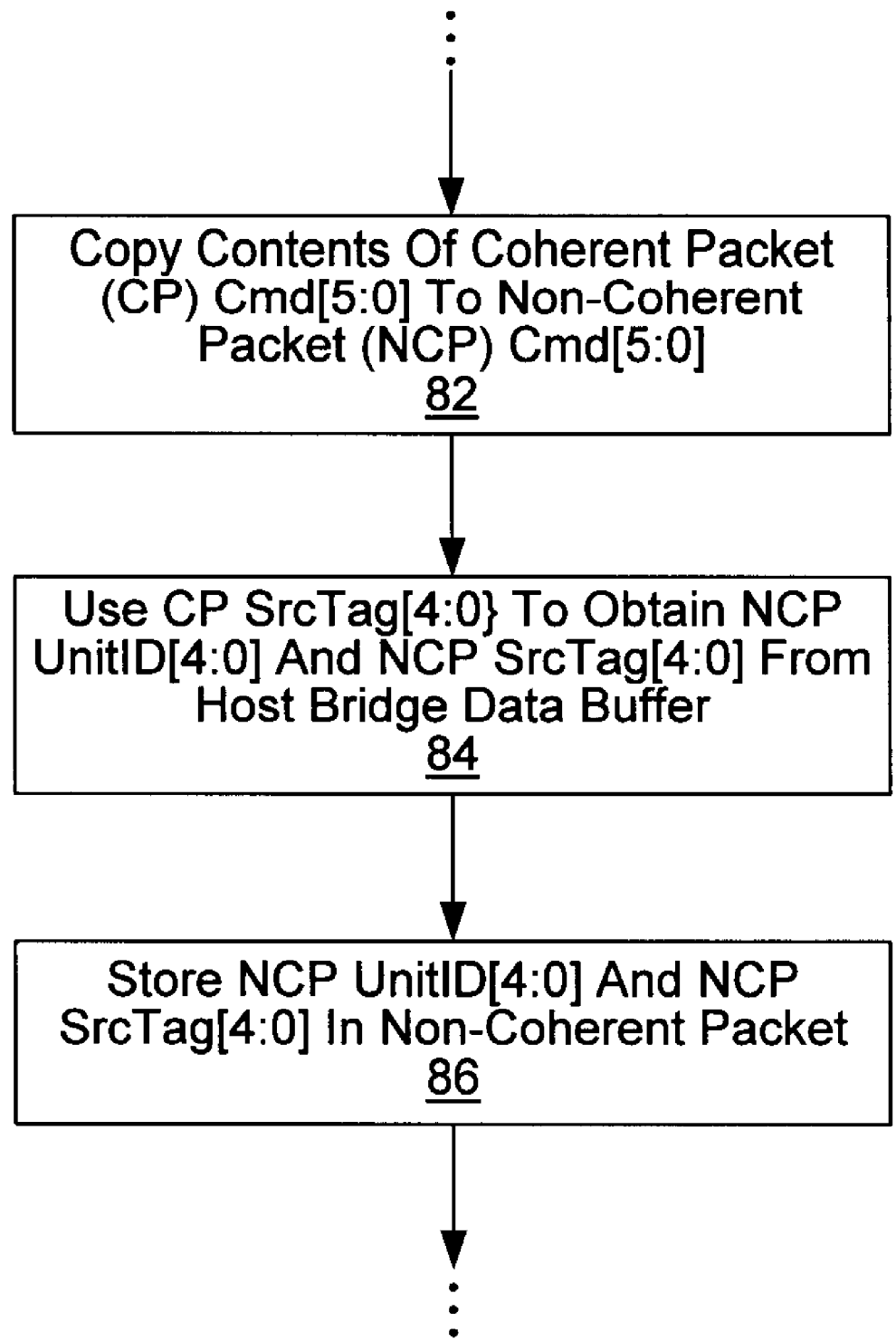
FIG. 13 is a flow chart of one implementation of a method for translating a coherent response packet to a non-coherent response packet.

Host bridge 28 receives the CTD response packet from processing node 16D. If the write transaction is a non-posted write transaction, translation logic 60 translates the CTD response packet to a non-coherent target done (NTD) response packet directed to I/O node 24A. FIG. 13 is a flow chart of one implementation of a method for translating a coherent response packet to a non-coherent response packet. Translation logic 60 may embody the method of FIG. 13. During a first step 82, translation logic 60 copies the contents of the command field Cmd[5:0] of the CTD response packet to the command field Cmd[5:0] of the NTD response packet. It is noted that locations of the command fields Cmd[5:0] within the CTD and NTD response packets are identical as shown in FIGS. 5 and 9.

During a step 84, translation unit 60 uses the contents of the source tag field SrcTag[4:0] of the CTD response packet to obtain values for the unit ID field UnitID[4:0] and the source tag field SrcTag[4:0] of the NTD response packet from table 64 within data buffer 62 of host bridge 28. Translation logic 60 provides the contents of the source tag field SrcTag[4:0] of the CTD response packet to data buffer 62. Data buffer 62 searches table 64 for a corresponding entry having a SOURCE TAG field within the coherent transaction data portion and containing a value which matches the contents of the source tag field SrcTag[4:0] of the CTD response packet.

When data buffer 62 locates the corresponding entry within table 64, data buffer 62 may provide data from the non-coherent transaction data portion of the corresponding entry, including the contents of the unit ID field UnitID[4:0] and the source tag field SrcTag[4:0] of the NSW command packet resulting in the NTD response packet, to translation logic 60. Data buffer 62 may then invalidate the corresponding entry (e.g., by setting the valid bit V of the corresponding entry to "0"). Translation logic 60 stores the contents of the unit ID field UnitID[4:0] of the NSW command packet within the unit ID field UnitID[4:0] of the NTD response packet, and stores the contents of the source tag field SrcTag[4:0] of the NSW command packet within the source tag field SrcTag[4:0] of the NTD response packet during a step 86.

Referring back to FIG. 2, host bridge 28 provides the NTD response packet to packet processing logic 34 for issuance. Packet processing logic 34 provides the NTD response packet to interface 32, and interface 32 transmits the NTD response packet to I/O node 24A via communication link 26A.

In a second example, assume processing node 16D of FIG. 1 produces a write transaction directed to an address within an I/O space assigned to I/O node 24A. Processing node 16D produces the write transaction as a coherent sized write (CSW) transaction. The CSW transaction includes a coherent sized write command packet followed by a coherent data packet. Processing node 16D transmits the packets of the CSW transaction to processing node 16C via coherent communication link 18C. Interface 30B of processing node 16C receives the packets of the CSW transaction and provides the information contained within the packets of the CSW transaction to packet processing logic 34. Host bridge 28 within packet processing logic 34 uses the address within the CSW command packet and the address map described above to determine that I/O node 24A is the target. Translation logic 60 of host bridge 28 translates the CSW transaction to a non-coherent sized write (NSW) transaction with I/O node 24A as the target node. Translation logic 60 may also translate the CSW data packet to an NSW data packet.

Figure 14:
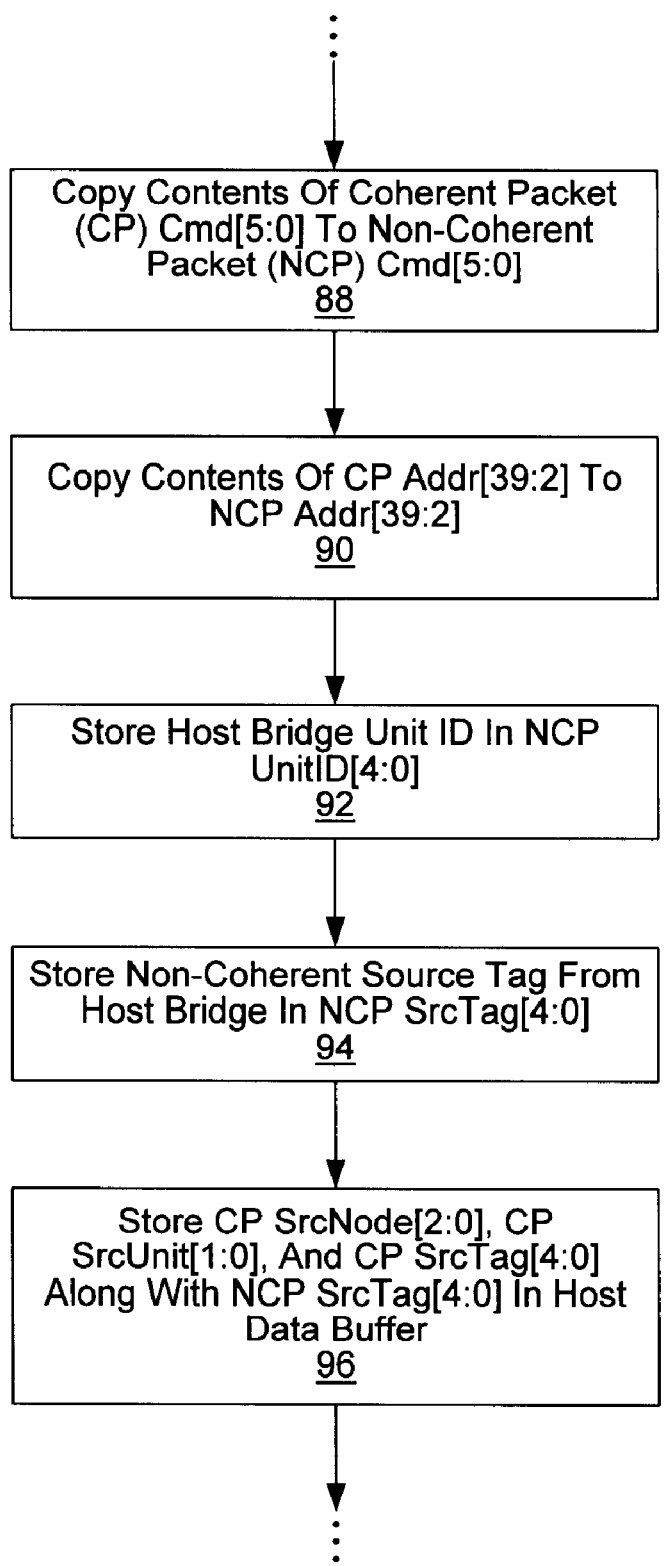
FIG. 14 is a flow chart of one implementation of a method for translating a coherent command packet to a non-coherent command packet.

FIG. 14 is a flow chart of one implementation of a method for translating a coherent command packet to a non-coherent command packet. Translation logic 60 may embody the method of FIG. 14. During a first step 88, translation logic 60 copies the contents of the command field Cmd[5:0] of the CSW command packet to the command field Cmd[5:0] of the NSW command packet. Translation logic 60 also copies the contents of address field Addr[39:32] of the CSW command packet to the corresponding address field Addr[39:2] of the NSW command packet during a second step 90. During a third step 92, translation logic 60 stores the unit ID of host bridge 28 within the unit ID field UnitID[4:0] of the NSW command packet.

Host bridge 28 stores a number of source tags used to identify non-coherent transactions. Translation logic 60 obtains a source tag identifying the NSW command packet from host bridge 28. Translation logic 60 stores the source tag within source tag field SrcTag[4:0] of the NSW command packet during a step 94.

Referring back to FIG. 11, each entry of table 64 within data buffer 62 may include a SOURCE NODE field and a SOURCE UNIT field along with the SOURCE TAG field in the portion of table 64 associated with coherent transaction data. The SOURCE NODE field may be used to store a node ID of a node originating a transaction, and the SOURCE UNIT field may be used to store a unit ID of a device within the source node origination the transaction. During a step 96, translation logic 60 stores coherent and non-coherent data associated with the write transaction within data buffer 62. Translation logic 60 provides the contents of SrcNode[2:0], SrcUnit[1:0], and SrcTag[4:0] of the CSW command packet, along with the contents of SrcTag[4:0] assigned to the NSW command packet, to data buffer 62. Data buffer 62 may store the contents of SrcNode[2:0] of the CSW command packet within the SOURCE NODE field of the coherent transaction data portion of an available (e.g., invalid) entry within table 64. Data buffer 62 may store the contents of SrcUnit[1:0] of the CSW command packet within the SOURCE UNIT field of the coherent transaction data portion of the entry, the contents of SrcTag[4:0] of the CSW command packet within the SOURCE TAG field of the coherent transaction data portion of the entry, and the contents of SrcTag[4:0] of the NSW command packet within the SOURCE TAG field of the non-coherent transaction data portion of the entry. Data buffer 62 may also set valid bit V of the entry to "1" to indicate that the entry is valid.

Referring back to FIG. 2, host bridge 28 provides the packets of the NSW transaction (i.e., the NSW command packet and the NSW data packet) to packet processing logic 34 for issuance. Packet processing logic 34 provides the packets of the NSW transaction to interface 32. Interface 32 transmits the packets of the NSW transaction to I/O node 24A via communication link 26A. The packet processing logic of I/O node 24A uses the address information of the transaction to determine that I/O node 24A is to receive the NSW.

Figure 15:
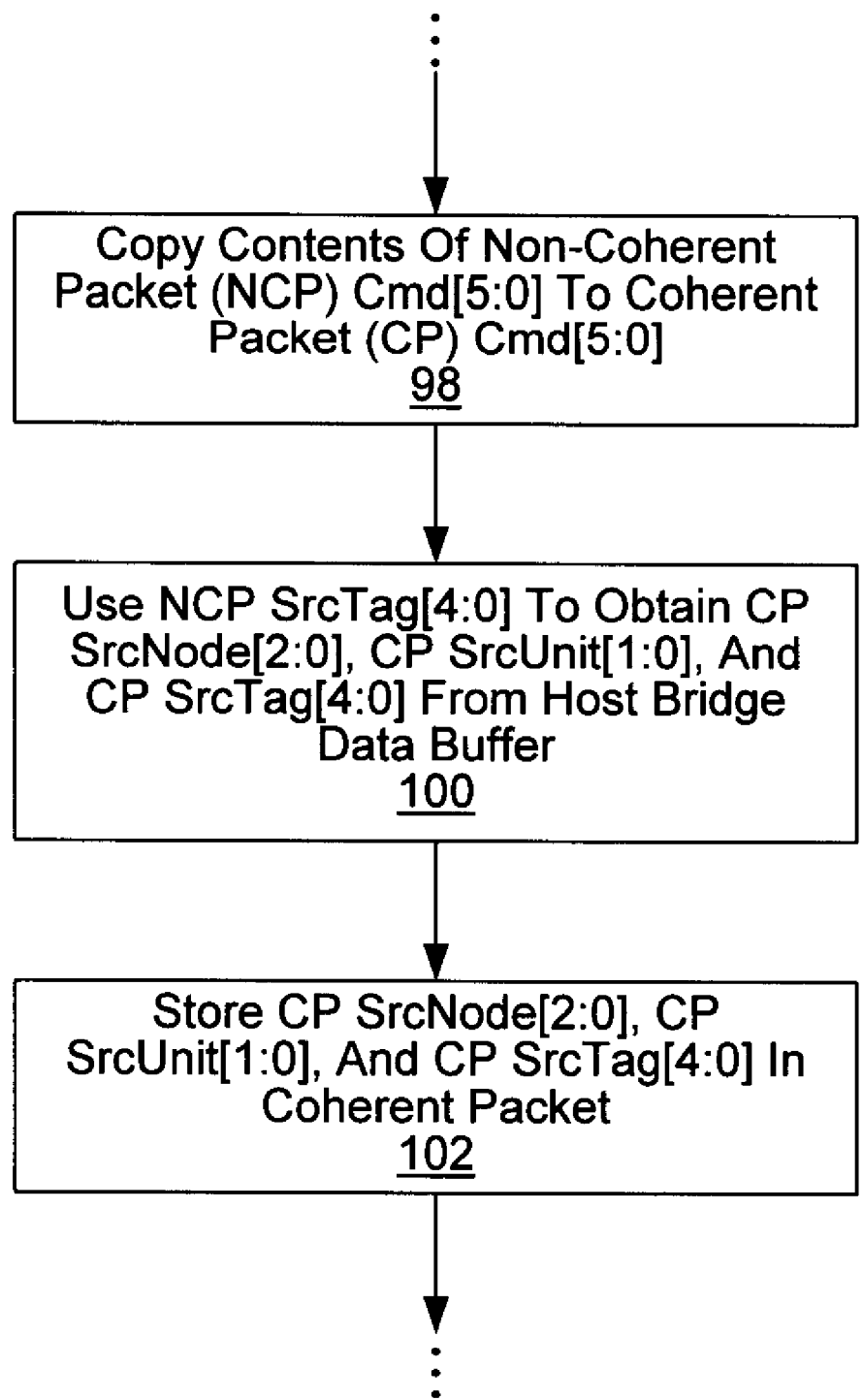
FIG. 15 is a flow chart of one implementation of a method for translating a non-coherent response packet to a coherent response packet.

I/O logic within I/O node 24A receives the NSW operation and transmits a non-coherent target done (NTD) response packet to host bridge 28. Host bridge 28 receives the NTD response packet from I/O node 24A. If the write transaction is a posted write transaction, translation logic 60 translates the NTD response packet to a coherent target done (CTD) response packet. FIG. 15 is a flow chart of one implementation of a method for translating a non-coherent response packet to a coherent response packet. Translation logic 60 may embody the method of FIG. 15. During a first step 98, translation logic 60 copies the contents of the command field Cmd[5:0] of the NTD response packet to the command field Cmd[5:0] of the CTD response packet.

During a step 100, translation unit 60 uses the contents of the source tag field SrcTag[4:0] of the NTD response packet to obtain values for the source node field SrcNode[2:0], the source unit field SrcUnit[1:0], and the source tag field SrcTag[4:0] of the CSW command packet from table 64 within data buffer 62 of host bridge 28. Translation logic 60 provides the contents of the source tag field SrcTag[4:0] of the NTD response packet to data buffer 62. Data buffer 62 searches table 64 for a corresponding entry having a SOURCE TAG field within the non-coherent transaction data portion and containing a value which matches the contents of the source tag field SrcTag[4:0] of the NTD response packet.

When data buffer 62 locates the corresponding entry within table 64, data buffer 62 may provide data from the non-coherent transaction data portion of the corresponding entry, including the contents of the source node field SrcNode[2:0], the source unit field SrcUnit[1:0], and the source tag field SrcTag[4:0] of the CSW command packet to translation logic 60. Data buffer 62 may then invalidate the corresponding entry (e.g., by setting the valid bit V of the corresponding entry to "0"). Translation logic 60 stores the contents of the source node field SrcNode[2:0] of the CSW command packet within the destination node field DestNode[2:0] of the CTD response packet, the contents of the source unit field SrcUnit[1:0] of the CSW command packet within the destination unit field DestUnit[1:0] of the CTD response packet, and stores the contents of the source tag field SrcTag[4:0] of the CSW command packet within the source tag field SrcTag[4:0] of the CTD response packet during a step 102.

Referring back to FIG. 2, host bridge 28 provides the CTD response packet to packet processing logic 34 for issuance. Packet processing logic 34 provides the CTD response packet to interface 30B, and interface 30B transmits the CTD response packet to processing node 16D via communication link 18C.

FIGS. 3–6, 8, and 9 illustrate packets for 8-bit coherent communication links. Packets for 16 and 32 bit links may be formed by concatenating consecutive bit times. For example, bit time 1 of a packet on a 16-bit link may comprise the information transmitted during bit times 1 and 2 on the 8-bit link. Similarly, bit time 1 of the packet on a 32-bit link may comprise the information transmitted during bit times 1–4 on the 8-bit link.

Numerous variations and modifications will become apparent to those skilled in the art once the above disclosure is fully appreciated. It is intended that the following claims be interpreted to embrace all such variations and modifications.

What is claimed is:

1. A computer system, comprising:
    a processing subsystem including a first processing node coupled to a second processing node via a coherent communication link on which the first processing node and the second processing node are configured to transmit coherent packets during use, the coherent packets used to maintain consistency of data stored in memory and in one or more caches included in the processing subsystem, wherein the first processing node comprises a host bridge;
    an input/output (I/O) node coupled to the first processing node via a non-coherent communication link on which the first processing node and the I/O node are configured to transmit only non-coherent packets during use, and wherein the coherent find non-coherent communication links are separate and have the same electrical interface and the same signal definition
    wherein the host bridge is coupled to receive a non-coherent packet from the I/O node via the non-coherent communication link and configured to respond to the non-coherent packet by translating the non-coherent packet to a coherent packet and transmitting the coherent packet to the second processing node via the coherent communication link; and
    wherein the coherent and non-coherent packets have identically located command fields, and wherein said translating comprises copying the contents of the command field of the non-coherent packet to the command field of the coherent packet.

2. The computer system as recited in claim 1, wherein the command field identifies a command to be carried out.

3. The computer system as recited in claim 1, wherein the coherent packet further comprises a destination node field for storing destination node identification information and a destination unit field for storing destination unit identification information, and wherein the first processing node further comprises an address map, and wherein the non-coherent packet includes address information, and wherein said translating further comprises:
    using the address information and the address map to determine a destination node identifier and a destination unit identifier, wherein the destination node identifier identifies the destination node, and wherein the destination unit identifier identifies the destination unit;
    storing the destination node identifier within the destination node field of the coherent packet; and
    storing the destination unit identifier within the destination unit field of the coherent packet.

4. The computer system as recited in claim 3, wherein the address map includes address ranges and corresponding node identifiers and unit identifiers.

5. The computer system as recited in claim 1, wherein the coherent packet further comprises a source tag field for storing coherent packet identification information, and wherein said translating further comprises:
    obtaining a coherent source tag for the coherent packet from the first processing node, wherein the coherent source tag identifies the coherent packet; and
    storing the coherent source tag within the source tag field of the coherent packet.

6. The computer system as recited in claim 5, wherein the non-coherent packet further comprises a unit identifier which identifies the I/O node as the source of the non-coherent packet and a non-coherent source tag which identifies the non-coherent packet.

7. The computer system as recited in claim 6, wherein the host bridge comprises a data buffer, and wherein said translating further comprises storing the coherent source tag and the corresponding unit identifier and the non-coherent source tag within the data buffer.

8. A computer system, comprising:
    a processing subsystem including a first processing node coupled to a second processing node via a coherent communication link on which the first processing node and the second processing node are configured to transmit coherent packets, the coherent packets used to maintain consistency of data stored in memory and in one or more caches included in the processing subsystem, wherein the first processing node comprises a host bridge;
    an input/output (I/O) node coupled to the first processing node via a non-coherent communication link on which the first processing node and the I/O node are configured to transmit only non-coherent packets;
    wherein the coherent and non-coherent communication links are separate and have the same electrical interface and the same signal definition;
    wherein the host bridge is coupled to receive a coherent packet from the second processing node via the coherent communication link and configured to respond to the coherent packet by translating the coherent packet to a non-coherent packet and transmitting the non-coherent packet to the I/O node via the non-coherent communication link; and
    wherein the coherent and non-coherent packets have identically located command fields, and wherein said translating comprises copying the contents of the command field of the coherent packet to the command field of the non-coherent packet.

9. The computer system as recited in claim 8, wherein the command field identifies a command to be carried out.

10. The computer system as recited in claim 8, wherein the coherent packet further comprises a coherent source tag identifying the coherent packet, and wherein the non-coherent packet further comprises: (i) a unit identification field for storing destination unit identification information, and (ii) a source tag field for storing non-coherent packet identification information.

11. The computer system as recited in claim 10, wherein the host bridge comprises a data buffer used to store coherent source tags and corresponding unit identifiers and non-coherent source tags, and wherein said translating further comprises:

using the coherent source tag to obtain a unit identifier and a non-coherent source tag from the data buffer, wherein the unit identifier identifies the I/O node as the destination of the non-coherent packet, and wherein the non-coherent source tag identifies the non-coherent packet;

storing the unit identifier within the unit identification field of the non-coherent packet; and storing the non-coherent source tag within the source tag field of the non-coherent packet.

12. A method for use in a computer system, comprising:

a host bridge within a first processing node receiving a non-coherent packet from an input/output (I/O) node via a non-coherent communication link on which the first processing node and the I/O node are configured in transmit only non-coherent packets;

the host bridge translating the non-coherent packet to a coherent packet, wherein the coherent and non-coherent packets have identically located command fields, and wherein said translating comprises copying the contents of the command field of the non-coherent packet to the command field of the coherent packet; and the host bridge transmitting the coherent packet to a second processing node via a coherent communication link on which the first processing node and the second processing node are configured to transmit coherent packets, the coherent packets used to maintain consistency of data stored in memory and in one or more caches included in the first processing node and the second processing node, wherein the coherent and non-coherent communication links are separate and have the same electrical interface and the same signal definition.

13. The method as recited in claim 12, wherein said translating further comprises:

using address information of the non-coherent packet and an address map to determine a destination node identifier and a destination unit identifier of the coherent packet, wherein the destination node identifier identifies the destination node, and wherein the destination unit identifier identifies the destination unit;

storing the destination node identifier within a destination node field of the coherent packet; and storing the destination unit identifier within a destination unit field of the coherent packet.

14. The method as recited in claim 12, wherein said translating further comprises:

obtaining a coherent source tag from the first processing node, wherein the coherent source tag identifies the coherent packet; and storing the coherent source tag within a source tag field of the coherent packet.

15. A method for use in a computer system, comprising:

a host bridge within a first processing node receiving a coherent packet from a second processing node via a coherent communication link on which the first processing node and the second processing node are configured to transmit coherent packets, the coherent packets used to maintain consistency of data stored in memory and in one or more caches included in the first processing node and the second processing node;

the host bridge translating the coherent packet to a non-coherent packet, wherein the coherent and non-coherent packets have identically located command fields, and wherein said translating comprises copying the contents of the command field of the coherent packet to the command field of the non-coherent packet; and the host bridge transmitting the non-coherent packet to an input/output (I/O) node via a non-coherent communication link on which the first processing node and the I/O node are configured transmit only non-coherent packets, wherein the coherent and non-coherent communication links are separate and have the same electrical interface and the same signal definition.

16. The method as recited in claim 15, wherein said translating further comprises:

using a coherent source tag of the coherent packet to retrieve a unit identifier and a non-coherent source tag from a data buffer within the host bridge;

storing the unit identifier within a unit identification field of the non-coherent packet; and storing the non-coherent source tag in a source tag field of the non-coherent packet.

17. A node comprising a host bridge coupled to receive a non-coherent packet from an I/O node on a non-coherent link to the node on which the node and the I/O node are configured to transmit only non-coherent packets, wherein the host bridge is configured to translate the non-coherent packet to a coherent packet for transmission on a coherent link on which the node is configured to transmit coherent packet, the coherent packets used to maintain consistency of data stored in memory and in one or more caches include in the node, and wherein the coherent and non-coherent packets have a command field located in the same position within the coherent packet and the non-coherent packet, and wherein the host bridge is configured to copy the command field from the non-coherent packet to the coherent packet as a part of translating the non-coherent packet to the coherent packet, and wherein the coherent and non-coherent links are separate and have the same electrical interface and the same signal definition.

18. The node as recited in claim 17, wherein the coherent packet further comprises a destination node field and a destination unit field, and wherein the node further comprises an address map, and wherein the non-coherent packet includes an address, and wherein the host bridge is coupled to the address map and is configured to determine a destination node identifier and a destination unit identifier from the address map using the address from the non-coherent packet, wherein the destination node identifier identifies the destination node and wherein the destination unit identifier identifies the destination unit, and wherein the host bridge is configured to supply the destination node identifier within the destination node field of the coherent packet and to supply the destination unit identifier within the destination unit field of the coherent packet.

19. The node as recited in claim 18, wherein the address map includes address ranges and corresponding node identifier, and unit identifiers.

20. The node as recited in claim 17, wherein the coherent packet further comprises a source tag field, and wherein the host bridge is configured to obtain a coherent source tag for the coherent packet and supply the coherent source tag within the source tag field of the coherent packet.

21. The node as recited in claim 20, wherein the non-coherent packet further comprises a unit identifier which identifies the I/O node as the source of the non-coherent packet and a non-coherent source tag which identifies the non-coherent packet, and wherein the host bridge comprises a data buffer, and wherein the host bridge is configured to store the coherent source tag and the corresponding unit identifier and the non-coherent source tag within the data buffer.

22. The node as recited in claim 17 wherein the host bridge is further coupled to receive a second coherent packet from the coherent link and is configured to translate the second coherent packet to a second non-coherent packet for transmission on the non-coherent link.

23. A computer system comprising:

a plurality of coherent nodes interconnected by coherent links on which the plurality of coherent nodes are configured to transmit coherent packets, the coherent packets used to maintain consistency of data stored in memory and in one or more caches included in one or more of the plurality of coherent nodes, wherein at least a first node of the plurality of coherent nodes includes a host bridge and is coupled to a non-coherent link on which the first node is configured to transmit only non-coherent packets; and an input/output (I/O) node coupled to the non-coherent link and configured to transmit a non-coherent packet on the non-coherent link;

wherein the host bridge is configured to translate the non-coherent packet to a coherent packet for transmission to one or more of the plurality of coherent nodes, and wherein a command field of the non-coherent and coherent packets is located in a same position within the non-coherent and coherent packets, and wherein the host bridge is configured to copy the command from the command field of the non-coherent packet to the command field of the coherent packet, and wherein the coherent and non-coherent links are separate and have the same electrical interface and the same signal definition.

24. The computer system as recited in claim 23, wherein the coherent packet further comprises a destination node field and a destination unit field, and wherein the first node further comprises an address map, and wherein the non-coherent packet includes an address, and wherein the host bridge is coupled to the address map and is configured to determine a destination node identifier and a destination unit identifier from the address map using the address, from the non-coherent packet, wherein the destination node identifier identifies the destination node and wherein the destination unit identifier identifies the destination unit, and wherein the host bridge is configured to supply the destination node identifier within the destination node field of the coherent packet and to supply the destination unit identifier within the destination unit field of the coherent packet.

25. The computer system as recited in claim 23, wherein the coherent packet further comprises a source tag field, and wherein the host bridge is configured to obtain a coherent source tag for the coherent packet and supply the coherent source tag within the source tag field of the coherent packet.

26. The computer system as recited in claim 25, wherein the non-coherent packet further comprises a unit identifier which identifies the I/O node as the source of the non-coherent packet and a non-coherent source tag which identifies the non-coherent packet, and wherein the host bridge comprises a data buffer, and wherein the host bridge is configured to store the coherent source tag and the corresponding unit identifier and the non-coherent source tag within the data buffer.

27. The computer system as recited in claim 23 wherein the host bridge is further coupled to receive a second coherent packet from the coherent link and is configured to translate the second coherent packet to a second non-coherent packet for transmission on the non-coherent link.

* * * * *